United States Patent [19]

DiMatteo

[11] Patent Number: 4,529,316
[45] Date of Patent: Jul. 16, 1985

[54] ARRANGEMENT OF ELIMINATING ERRONEOUS DATA IN THREE-DIMENSIONAL OPTICAL SENSORS

[75] Inventor: Paul DiMatteo, Huntington, N.Y.

[73] Assignee: Robotic Vision Systems, Inc., Hauppauge, N.Y.

[21] Appl. No.: 435,092

[22] Filed: Oct. 18, 1982

[51] Int. Cl.³ ............................................. G01B 11/24
[52] U.S. Cl. ........................................ 356/376; 356/1
[58] Field of Search ............... 356/1, 4, 376; 340/507, 340/508; 356/376; 351/1, 4

[56] References Cited

U.S. PATENT DOCUMENTS

| | | | |
|---|---|---|---|
| 2,220,427 | 11/1940 | Romanus | 340/508 |
| 2,249,891 | 7/1941 | Ekman et al. | 340/508 |
| 4,202,612 | 5/1980 | DiMatteo | 353/28 |
| 4,343,553 | 8/1982 | Nakagawa et al. | 356/376 |
| 4,373,804 | 2/1983 | Pryor et al. | 356/376 |
| 4,448,532 | 5/1984 | Joseph et al. | 356/237 |

*Primary Examiner*—R. A. Rosenberger
*Attorney, Agent, or Firm*—Max Fogiel

[57] ABSTRACT

An arrangement for eliminating erroneous data in three-dimensional optical sensors, in which a point on a surface is illuminated, and reflections from the point are received at a first location spaced from the source of illumination. The three-dimensional location of the point is computed as a function of the reflection that is received at the first location. The procedure of illuminating the point is repeated for obtaining reflections from the point at a second location which is spaced from the first location and the illuminating source. After computing the three-dimensional location of the point obtained from data dependent on the reflection at the second location, the computations relative to the first and second locations are compared. If the computations produce substantially identical results, the point is designated to be a true point on the surface. When, on the other hand, the results produced by the two computations differ substantially, then the point is designated to be a false point which does not lie on the surface.

6 Claims, 5 Drawing Figures

ARRANGEMENT OF ELIMINATING ERRONEOUS DATA IN THREE-DIMENSIONAL OPTICAL SENSORS

BACKGROUND OF THE INVENTION

From U.S. Pat. No. 4,202,612 it is known how to sense the geometric characteristics of an object or surface by sensing the location of points thereon. In sensing such points on a surface, however, false data may be obtained from the sensor systems, resulting in an incorrect representation of the surface being investigated.

The present invention relates to techniques from which it is possible to determine whether data on any points that are reported by a three-dimensional optical sensor are erroneous. By identifying erroneous data points, the information is available for eliminating such erroneous points. These erroneous points may be caused by light directed into the optical sensor or detector, which is not related to the primary projector light beam reflections. Thus, such erroneous points can be caused by secondary light reflections from a projector beam, or from another light source.

Accordingly, it is an object of the present invention to provide an arrangement for eliminating all points reported by a sensor, which are not true data points from the projector's primary light beam.

Another object of the present invention is to provide an arrangement of the foregoing character which is substantially simple in construction and may be economically produced.

A further object of the present invention is to provide an arrangement, as described, which has a substantially long operating life and may be readily maintained in service.

SUMMARY OF THE INVENTION

According to the present invention, the surface location of points is measured with two different sensors, and false data reports are detected and eliminated by cross-correlating the data obtained from two different optical detector locations. The true reports from each sensor location will compare favorably and can be designated as true reports. False reports will not compare identically, as will the true reports, and as a result such non-identical comparisons can be used to efficiently eliminate the false report. With such elimination of these false reports, only the true data is left, as desired.

To obtain the data reports, a point on a surface being investigated is illuminated by a projector, and the light directed onto the surface at that point is reflected and directed onto a detector, from which the location of the point is computed by, for example, triangulation methods. The light applied to the surface at the point being investigated is also reflected in a different direction onto another detector, for example, which uses the detected reflected light to compute the position of that point on the surface. The two computations are then compared to determine whether the results are identical or not. If the computational results are identical, then the point detected on the surface can be designated as a true point. If, on the other hand, the computational results are not identical, then it may be concluded that the point which has been detected is not a true point on the surface.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
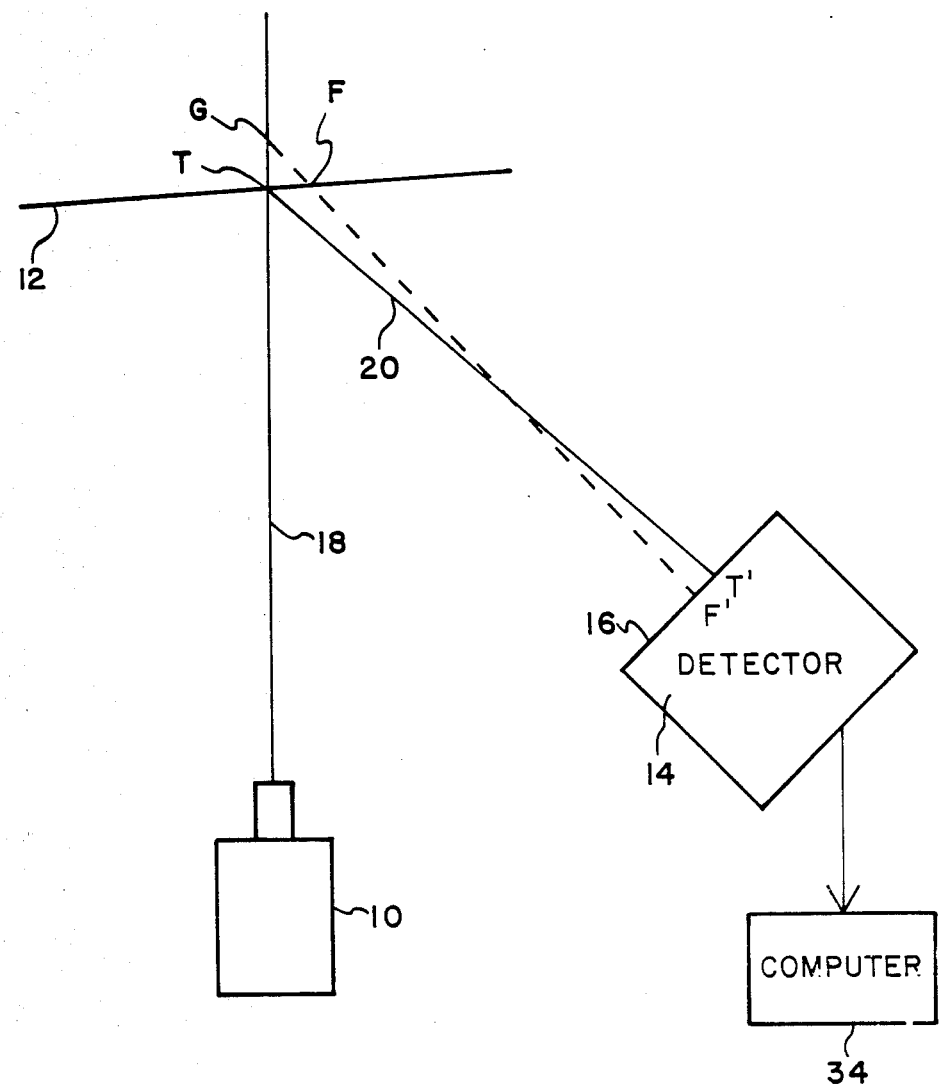
FIG. 1 is a schematic plan view and shows the relationship between the surface being investigated, a projector and a detector for sensing the location of a point on the surface, according to the present invention.

Referring to the drawings, FIG. 1 shows the essential elements for determining the depth location of a point on a surface. Projector 10 projects a narrow beam of light onto the surface 12 at point T, which is reflected and focused on the detector 14 at point T' on the image plane 16 of this detector 14. By knowing the locations and orientations in space of the projector 10 and detector 14, together with the projected beam 18 and reflected beam 20, the three-dimensional location of point T can be calculated.

If a spurious or falsely illuminated point F on the surface occurs within the field of view of detector 14, the location of point F is calculated as being at point G, along the projector beam 18.

With only these two data points, no reliable method or technique exists for determining if either or both points are false data.

Figure 2:
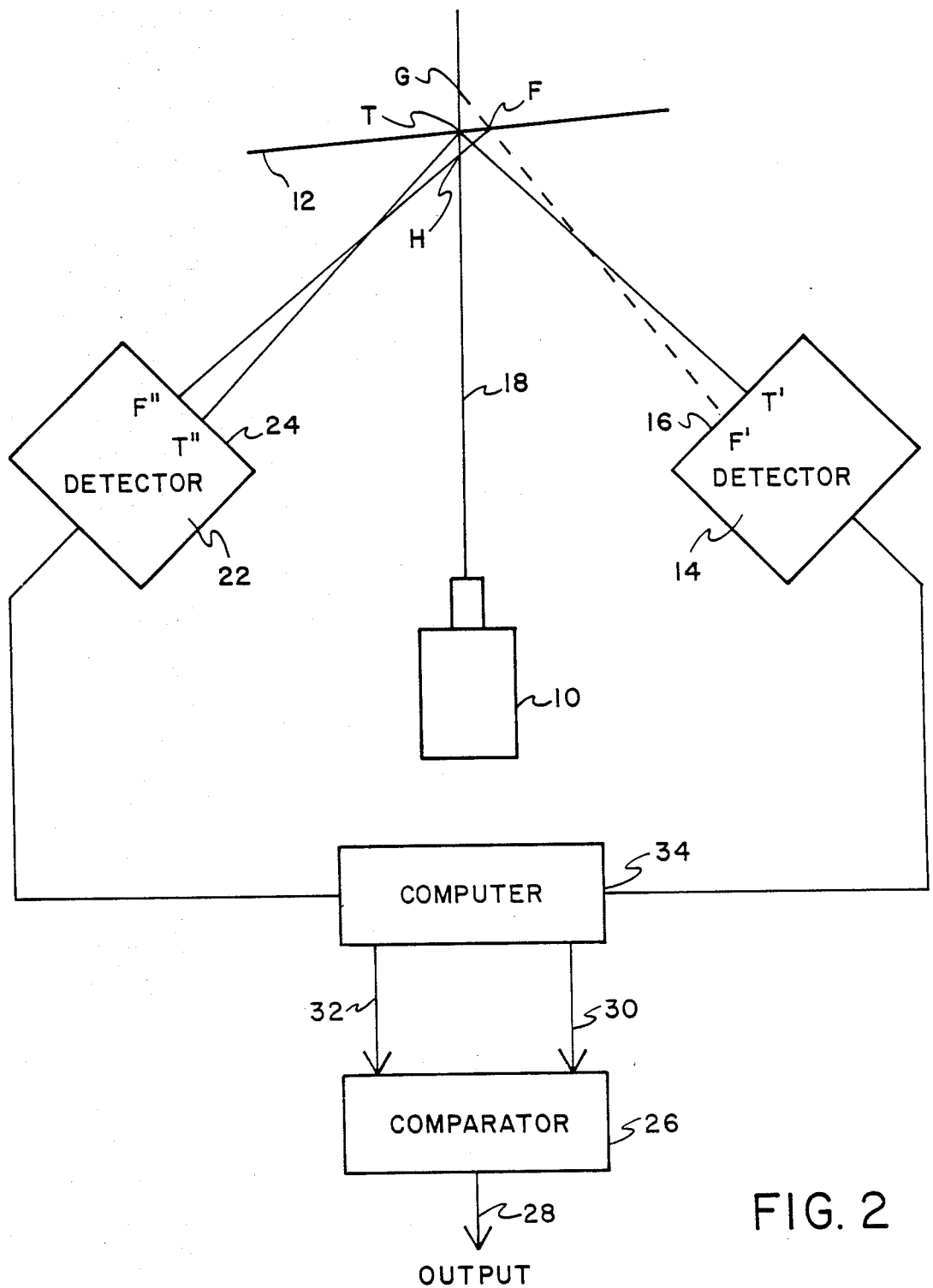
FIG. 2 is a schematic view and shows an embodiment in which two detectors cooperate with one projector for determining true and erroneous data points.

In FIG. 2, a second detector 22 is used to report the locations of points T and F in a similar manner as carried out above. However, point F is reported or calculated to be located on the projector axis 18, at point H.

When data from detectors 14 and 22 are compared in the comparator 26, the data for the true point T will be found the same by both detectors, and the comparator will find the two sets of data to agree, whereby the output from the comparator 26 may be interpreted as point T being a true point. The reflections of points T and F impinge on the detector 22, on its image plane 24 at points T' "and S", respectively.

When, on the other hand, the data outputs from detectors 14 and 22 are found not to be identical by the comparator 26, the output of this comparator may be interpreted that the point F is a false point.

As may be observed from FIG. 2, the technique for eliminating false points used two detectors and one projector. The same results, however, can also be obtained by the arrangement of FIG. 3 in which two sensing systems are provided, each having a projector.

Figure 3:
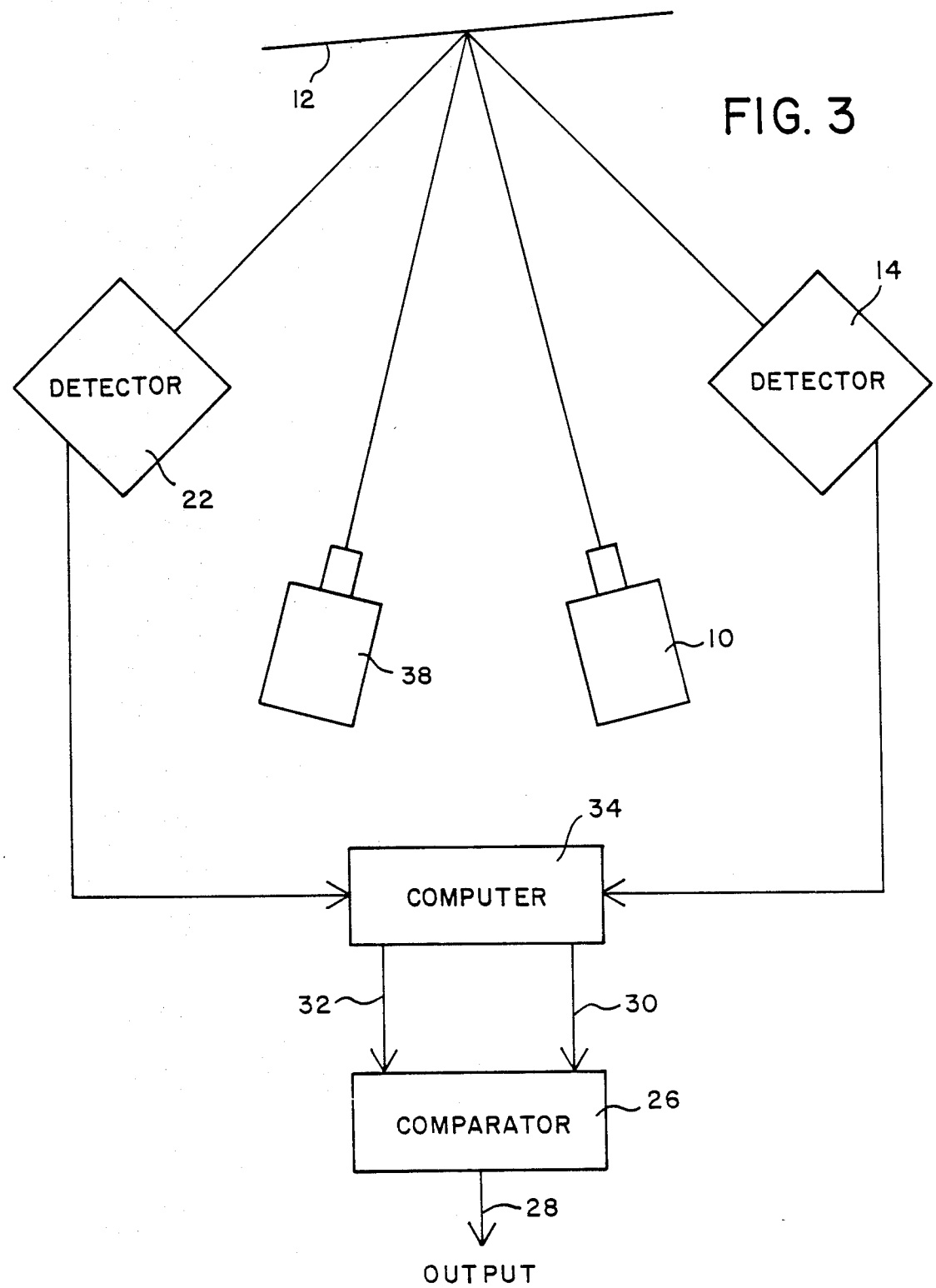
FIG. 3 is a schematic view of an embodiment in which two sensors, each equipped with a camera and a projector, are used to determine true and erroneous data points.

Thus, the arrangement in FIG. 3 uses two independent sensors, each equipped with its own detector and projector. Accordingly, detector 14 cooperates with its own projector 10 whereas detector 22 is provided with its own projector 38. With these two detector locations, it is possible to determine the erroneously reported data, similar to what was described in relation to FIG. 2. The arrangement of FIG. 3, however, requires more equipment than FIG. 2, and is slower than this arrangement of FIG. 2.

Figure 4:
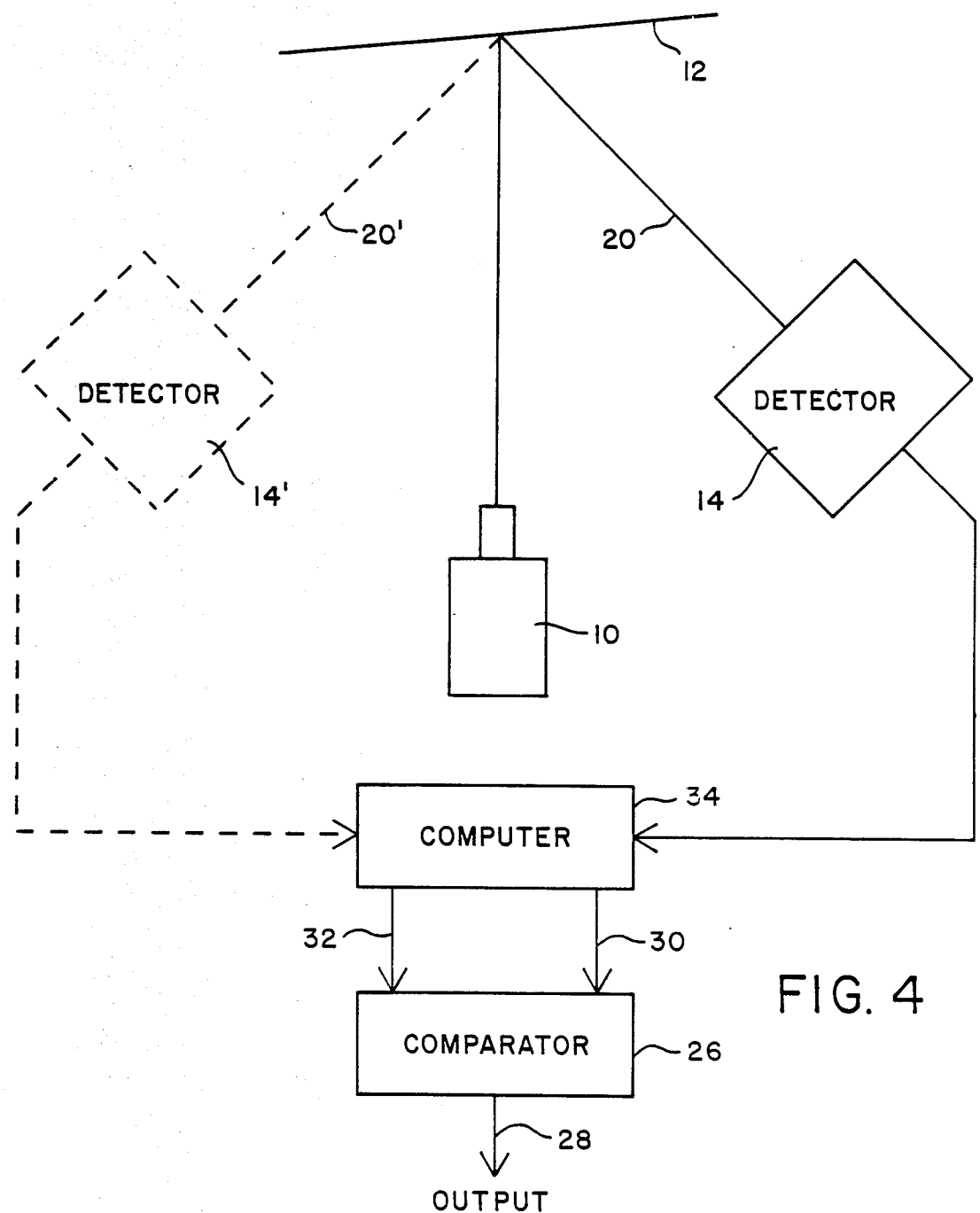
FIG. 4 is a schematic view of a further embodiment in which a single detector is used in combination with a single projector to eliminate erroneous data points.

FIG. 4 is another embodiment in which only one projector 10 and one detector 14 is used to provide the desired results. In this arrangement of FIG. 4, the detector 14 is moved to the second position 14′, shown by dashed lines, to obtain a second set of data for comparison purposes by the comparator 26. The second position of the detector 14 and its beam axis 20 is represented in FIG. 4 by dashed elements 14′ and 20′ respectively.

Figure 5:
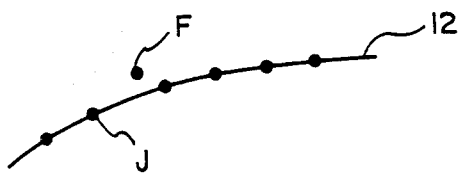
FIG. 5 is a schematic view and shows a method for detecting erroneous data points by computational techniques.

FIG. 5 shows a still further embodiment in which a false point F is identified from computational data associated with a number of neighboring points J lying on the surface. Thus, after determining the locations of the various neighboring points J, and the false point F, and a surface is passed through the points J, the point F is found not to lie on that surface, and therefore may be identified as a spurious point. This technique of excluding such spurious points F from other points found to lie on a surface, is commonly known as curve fitting or surface fitting. As may be seen, this technique requires considerable computations which are complex and require substantial processing time and/or processing equipment. The technique is generally feasible for relatively simple surfaces.

For purposes of computing the three-dimensional location of the true and false points that are detected at the different locations of the detectors, a computer 34 is provided. This computer calculates the three-dimensional locations of the points by using conventional triangulation calculations based on data obtained from the detectors, as well as the relative locations of the detectors and projectors. The computer 34 applies the computed results to the comparator 26 for comparison purposes. Thus, for example, the data obtained by the detector 14 is applied to the comparator 26 at the input 30 thereof, whereas the data from detector 22 is applied to the comparator through its input 32. After comparing the computed results obtained from the two different locations of the detectors, the comparator applies its output signal through its output terminal 28 which may, in turn, be connected to an indicator, for example.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A method for eliminating erroneous data in three-dimensional optical sensors, comprising the steps of: illuminating a point on a surface by a source of illumination; receiving a reflection of the illuminated point at a first location spaced from said source; computing in a first computation the three-dimensional location of said point dependent on the reflection received at said first location; receiving a reflection of the illuminated point at a second location spaced from said source and said first location; computing in a second computation the three-dimensional location of said point dependent on the reflection received at said second location; comparing said first and second computations; designating said point on the surface a true point when said first and second computations are substantially the same, and designating said point not to be on the surface when said first and second computations are substantially different, whereby false data obtainable from multiple reflections are identified from measurements taken in two directions.

2. A method as defined in claim 1, the step of moving a receiver for receiving reflection at said first location to said second location for receiving also the reflection at said second location.

3. A method as defined in claim 1 including the step of illuminating said point by two different sources.

4. Apparatus for eliminating erroneous data in three-dimensional sensors, comprising: means for illuminating a point on a surface; means for receiving a reflection of the illuminated point at a first location spaced from said illuminating means; means for computing in a first computation the three-dimensional location of said point dependent on the reflection received at said first location; means for receiving a reflection of the illuminated point at a second location spaced from said illuminating means and said first location; means for computing in a second computation the three-dimensional location of said point dependent on the reflection received at said second location; means for comparing said first and second computations; said point on the surface being designated a true point when said first and second computations are substantially the same, said point being designated not to be on the surface when said first and second computations are substantially different, whereby false data obtainable from multiple reflections are identified from measurements taken in two directions.

5. Apparatus as defined in claim 4 including auxiliary illuminating means for illuminating said point to provide the reflection at said second location, said first-mentioned illuminating means illuminating said point for providing the reflection at said first location.

6. Apparatus as defined in claim 4 wherein said means for receiving the reflection of the illuminated point at said first location is moved to said second location for receiving also the reflection at said second location.

* * * * *